United States Patent
Lan et al.

(10) Patent No.: US 12,333,678 B2
(45) Date of Patent: Jun. 17, 2025

(54) IMAGE CORRECTION METHOD, AND UNDER-SCREEN SYSTEM

(71) Applicant: ORBBEC INC., Guangdong (CN)

(72) Inventors: Fuyang Lan, Shenzhen (CN); Peng Yang, Shenzhen (CN); Zhaomin Wang, Shenzhen (CN); Yuanhao Huang, Shenzhen (CN); Zhenzhong Xiao, Shenzhen (CN)

(73) Assignee: Orbbec Inc., Shenzhen (CN)

( * ) Notice: Subject to any disclaimer, the term of this patent is extended or adjusted under 35 U.S.C. 154(b) by 194 days.

(21) Appl. No.: 18/209,696

(22) Filed: Jun. 14, 2023

(65) Prior Publication Data
US 2023/0325979 A1    Oct. 12, 2023

Related U.S. Application Data

(63) Continuation of application No. PCT/CN2021/107950, filed on Jul. 22, 2021.

(30) Foreign Application Priority Data

Mar. 24, 2021 (CN) .......................... 202110315005.3

(51) Int. Cl.
*G06T 5/00* (2024.01)
*G06T 5/50* (2006.01)
(Continued)

(52) U.S. Cl.
CPC ............... *G06T 5/00* (2013.01); *G06T 5/50* (2013.01); *G06T 7/50* (2017.01); *H04N 23/56* (2023.01); *H04N 23/81* (2023.01)

(58) Field of Classification Search
None
See application file for complete search history.

(56) References Cited

U.S. PATENT DOCUMENTS

| | | | |
|---|---|---|---|
| 5,598,265 A * | 1/1997 | de Groot | G01B 11/306 356/512 |
| 10,944,956 B2 | 3/2021 | Jian | |
| 2015/0208048 A1 | 7/2015 | Pei et al. | |

FOREIGN PATENT DOCUMENTS

| | | |
|---|---|---|
| CN | 105956530 A | 9/2016 |
| CN | 109087253 A | 12/2018 |
| CN | 109242901 A | 1/2019 |

OTHER PUBLICATIONS

PCT International Search Report and the Written Opinion mailed Dec. 22, 2021, issued in related International Application No. PCT/CN2021/107950, with partial English translation (8 pages).

(Continued)

*Primary Examiner* — James M Hannett
(74) *Attorney, Agent, or Firm* — Sheppard Mullin Richter & Hampton LLP (57) ABSTRACT

A method for correcting interference fringes includes: obtaining interference fringe images with different photographing distances; obtaining a to-be-corrected image including to-be-corrected pixels, and calculating a depth value of each to-be-corrected pixel in the to-be-corrected image; selecting, from the interference fringe images with different photographing distances, an interference fringe image corresponding to the depth value of each to-be-corrected pixel as a target interference fringe image; extracting first pixel values of target coordinate positions in the target interference fringe image; and correcting second pixel values of to-be-corrected pixels according to the first pixel values corresponding to the to-be-corrected pixels to obtain a corrected image.

20 Claims, 7 Drawing Sheets (51) Int. Cl.
     *G06T 7/50*            (2017.01)
     *H04N 23/56*        (2023.01)
     *H04N 23/81*        (2023.01)

(56)                  References Cited

OTHER PUBLICATIONS Zhigang Fan et al., "The Study of the Interferogram Processing", Optical Technique, vol. 26, No. 3, May 2000, with English language abstract (3 pages).

* cited by examiner

IMAGE CORRECTION METHOD, AND UNDER-SCREEN SYSTEM

CROSS-REFERENCE TO RELATED APPLICATIONS

This application is a Continuation Application of International Patent Application No. PCT/CN2021/107950 filed with the China National Intellectual Property Administration (CNIPA) on Jul. 22, 2021, which is based on and claims priority to and benefits of Chinese Patent Application No. 202110315005.3, filed on Mar. 24, 2021 and entitled "IMAGE CORRECTION METHOD, AND UNDER-SCREEN SYSTEM". The entire content of all of the above-referenced applications is incorporated herein by reference.

TECHNICAL FIELD

This application relates to the field of image processing technologies, and in particular, to an image correction method and an under-screen system.

BACKGROUND

With the continuous optimization of full screens by mobile phone manufacturers, an under-screen camera has become a standard configuration of most mobile phones. The under-screen camera usually uses an illumination source to supplement light for a target object through a display screen to capture a high-quality image.

However, due to a physical feature of the display screen, a beam emitted by the illumination source through the display screen is split into two beams. One of the beams is emitted directly through the display screen, and the other beam is reflected on the display screen and emitted after being reflected for many times. The two beams meet and overlap in a target region to generate interference fringes, resulting in poor quality of an image captured by the under-screen camera.

SUMMARY

In view of this, embodiments of this application provide an image correction method, an under-screen system, and a computer-readable storage medium, which can solve the problem that two beams meet and overlap in a target region to generate interference fringes, resulting in poor quality of an image captured by an under-screen camera.

A first aspect of the embodiments of this application provides an image correction method, including:

obtaining interference fringe images with different photographing distances, where each of the interference fringe images is captured by a camera and comprises interference fringes formed by an illumination source illuminating a target plane through a display screen; and each of the interference fringe images represents first pixel values of the interference fringes at different coordinate positions;

obtaining a to-be-corrected image comprising to-be-corrected pixels, and calculating a depth value of each of the to-be-corrected pixels in the to-be-corrected image;

selecting, from the interference fringe images with different photographing distances, an interference fringe image corresponding to the depth value of each of the to-be-corrected pixels as a target interference fringe image;

extracting first pixel values of target coordinate positions in the target interference fringe image, where the target coordinate positions are indictive of coordinate positions of the to-be-corrected pixels corresponding to the target interference fringe image in the to-be-corrected image; and correcting second pixel values of the to-be-corrected pixels according to the first pixel values corresponding to the to-be-corrected pixels to obtain a corrected image.

A second aspect of the embodiments of this application provides an under-screen system, including a display screen, an illumination source, a camera, a processor, and a memory, where the illumination source is configured to emit an infrared beam to a target region through the display screen; and the target region includes a target plane;

the camera is configured to receive an optical signal that passes through the display screen after being reflected by the target region, obtain an infrared image of the target region, and transmit the infrared image to the processor; the infrared image includes a to-be-corrected image and interference fringe images;

the processor is configured to correct the infrared image by using the interference fringe images and the correction method according to any one of the embodiments disclosed herein; and the memory is configured to store the interference fringe images with different photographing distances and a computer program executable on the processor.

A third aspect of the embodiments of this application provides a non-transitory computer-readable storage medium, storing a computer program, where the computer program, when executed by a processor, implements the steps of the correction method according to the first aspect.

Compared with the existing technologies, the embodiments of this application have the following beneficial effects. Because interference fringes are usually alternately dark and bright fringes, and the interference fringes with different depths are at different positions, in this application, a target interference fringe image corresponding to each to-be-corrected pixel is obtained through matching based on each to-be-corrected pixel in a to-be-corrected image. A first pixel value is obtained in the target interference fringe image according to a target coordinate position of each to-be-corrected pixel. The to-be-corrected pixel is corrected according to the first pixel value (because the first pixel values of the interference fringes at different coordinate positions can be well reflected in the target interference fringe image, the to-be-corrected pixel can be corrected based on the first pixel value in the target interference fringe image). By correcting to-be-corrected pixels one after another, the foregoing solution alleviates the problem of poor quality of a captured image caused by the interference fringes.

BRIEF DESCRIPTION OF THE DRAWINGS

To describe the technical solutions in the embodiments of this application more clearly, the following briefly introduces the accompanying drawings required for describing the embodiments or the related art. The accompanying drawings in the following description show merely some embodiments of this application, and a person of ordinary skill in the art may still derive other drawings from these accompanying drawings without creative efforts.

DETAILED DESCRIPTION

In the following description, for the purpose of illustration rather than limitation, details such as the system structure and technology are proposed to thoroughly understand the embodiments of this application. However, a person skilled in the art knows that this application may be implemented in other embodiments without these details. In other cases, detailed descriptions of well-known systems, apparatuses, circuits, and methods are omitted to avoid unnecessary details hindering the description of this application.

For better understanding of the technical problems resolved by this application, the foregoing background is further described herein.

Interference is a phenomenon in which two (or more) waves of a same amplitude, a same frequency, and different phases are combined to cause a redistribution of vibration intensities. In a superposition region of the waves, the amplitude increases at some points and decreases at other points, and high and low vibration intensities are in a fixed distribution in space, resulting in interference fringes.

In the existing technologies, in an imaging process of an under-screen camera, an illumination source generates a first beam and a second beam when passing through a display screen. There is a fixed phase difference between the first beam and the second beam. Therefore, the first beam and the second beam interfere stably in a target region to generate interference fringes. The interference fringes expand or shrink as a photographing distance changes. The interference fringes in images captured by a capture module (that is, the under-screen camera) at different photographing distances translate in a parallax direction.

In view of this, the embodiments of this application provide a method for correcting interference fringes, an under-screen system, and a computer-readable storage medium, which can solve the foregoing technical problems.

Figure 1:
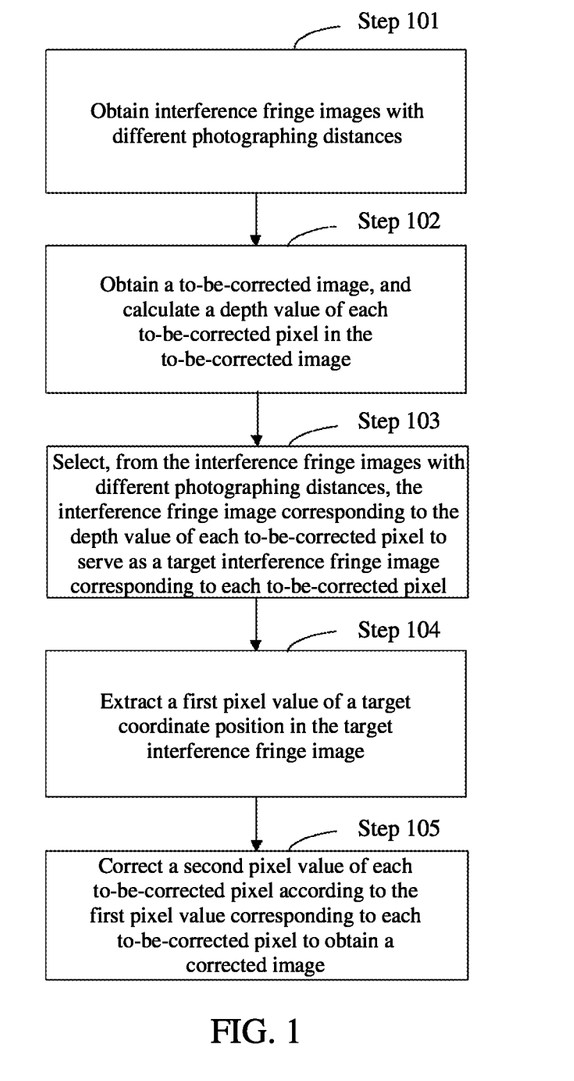
FIG. 1 is a flowchart of a method for correcting interference fringes according to this application.

FIG. 1 is a flowchart of a correction method for interference fringes according to this application. The correction method is applied to a terminal device with an under-screen camera, and includes the following steps.

Step 101: Obtain interference fringe images with different photographing distances, where each interference fringe image is captured by a capture module and including interference fringes formed by an illumination source illuminating a target plane through a display screen; and the interference fringe image represents first pixel values of the interference fringes at different coordinate positions.

As known to all, distribution positions of the interference fringes with different photographing distances may be shifted in the images, while the sizes are the same. The distribution positions of the interference fringes with the same photographing distance are consistent in the images. If the distribution positions of the interference fringes in the image (that is, the first pixel values of different coordinate positions) can be determined, the interference fringes can be eliminated. Therefore, based on the foregoing rule, in this application, the interference fringe images with different photographing distances are obtained to adaptively correct first pixels with different depth values in a to-be-corrected image.

In an embodiment, to better represent the first pixel values of the interference fringes at different coordinate positions, a plane with a white background and a uniform surface texture is used as a target plane. The target plane is used to reflect interference fringes generated by the illumination source through the display screen (the illumination source includes, but is not limited to, an infrared light source, a laser light source, or other light sources), and a size of the target plane is larger than a viewfinder coverage of the capture module (the capture module refers to a module/device configured to capture light information, such as a camera) at different photographing distances.

The target plane perpendicular to an optical axis of the capture module is placed in front of the capture module. The capture module captures interference fringes that appear on the target plane, to obtain the interference fringe image.

Figure 2:
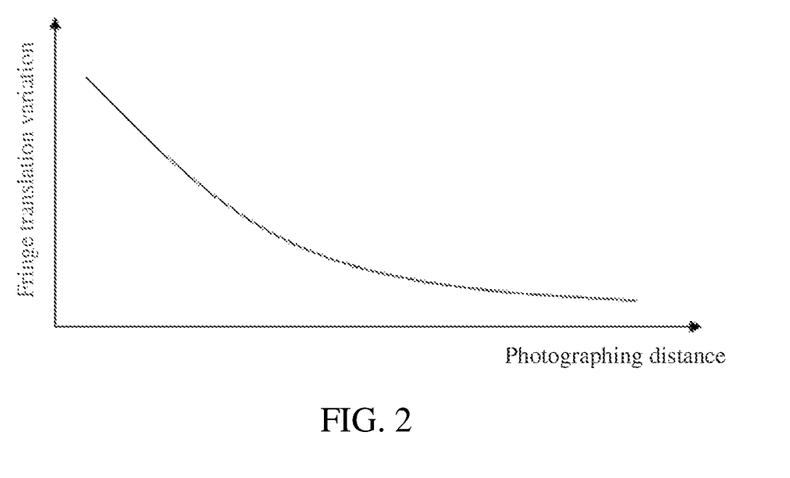
FIG. 2 is a schematic diagram of a translation variation curve of an interference fringe according to this application.

In an embodiment, a division policy for different photographing distances may be uniform division or non-uniform division, and intervals for different photographing distances can be preset according to correction fineness. Referring to FIG. 2, it can be seen that a ratio between the fringe translation variation and the photographing distance decreases in a curvilinear manner. That is, when the target plane moves forward and backward along the optical axis in a region close to the capture module, the translation variation of the interference fringes on the target plane is large. When the target plane moves forward and backward along the optical axis in a region farther away from the capture module, the translation variation of the interference fringes on the target plane is small.

Figure 3:
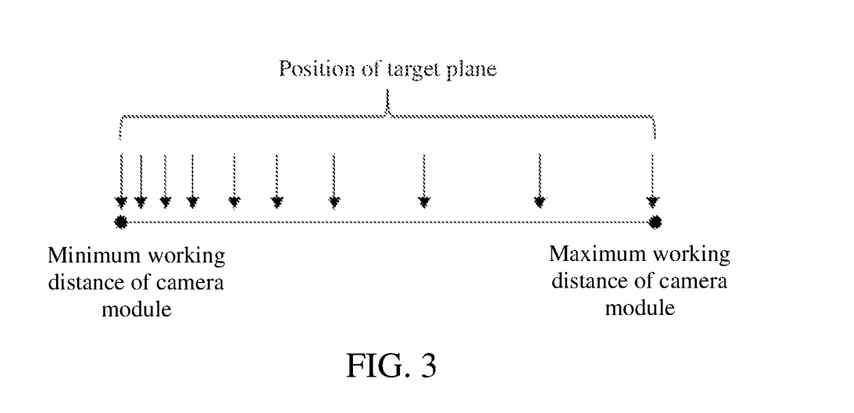
FIG. 3 is a schematic diagram of a division policy of photographing distances according to this application.

Therefore, based on the foregoing rule, the division policy for different photographing distances in this application is "dense in the near distance and sparse in the far distance." As shown in FIG. 3, as the target plane moves farther away, sampling positions for the target plane become sparse gradually, so as to scientifically divide the distribution density of the photographing distances.

In an embodiment of this application, one or more original images can be captured at the same photographing distance to serve as one or more interference fringe images. When there are a plurality of interference fringe images, multi-frame averaging may be performed to obtain a final interference fringe image.

In an embodiment of this application, after the interference fringe image is obtained, the interference fringe image can be preprocessed to improve image quality of the interference fringe image, thus obtaining a more precise correction effect. The preprocessing includes image processing means such as noise reduction or gray value adjustment.

Step 102: Obtain a to-be-corrected image, and calculate a depth value of each to-be-corrected pixel in the to-be-corrected image.

The to-be-corrected image in a target region is obtained, and depth values of a plurality of to-be-corrected pixels in the to-be-corrected image are calculated. According to the depth values of different to-be-corrected pixels, respective interference fringe images corresponding to the different to-be-corrected pixels are obtained. It can be understood that, as described above, positions of interference fringes in the images corresponding to different photographing distances are different. Different to-be-corrected pixels have different depth values. Therefore, it is necessary to match each to-be-corrected pixel with a corresponding interference fringe image.

In an embodiment, methods for obtaining the depth value include, but are not limited to, the following three methods.

In method 1, the illumination source projects a structured light beam to the target region. The capture module receives the beam reflected from the target region to generate an electrical signal, and transmits the electrical signal to a processor. The processor processes the electrical signal, calculates information representing the intensity of the beam to form a structured light pattern, and then performs matching calculation or triangulation calculation based on the structured light pattern to obtain the depth values of the plurality of to-be-corrected pixels.

In method 2, the illumination source projects an infrared beam to the target region. The capture module receives the beam reflected from the target region to generate an electrical signal, and transmits the electrical signal to a processor. The processor processes the electrical signal to calculate a phase difference, and calculates, based on the phase difference, a time of flight takes for the beam to travel from the illumination source to the camera. The depth values of the plurality of to-be-corrected pixels are calculated based on the time of flight. It should be understood that the infrared beam may include a pulse type or a continuous wave type, which is not limited herein.

In method 3, the illumination source projects an infrared pulse beam to the target region. The capture module receives the beam reflected from the target region to generate electrical signals, and transmits the electrical signals to a processor. The processor counts the electrical signals to obtain a waveform histogram, and calculates, according to the histogram, a time of flight takes for the beam to travel from the illumination source to the camera. The depth values of the plurality of to-be-corrected pixels are calculated based on the time of flight.

In an embodiment of this application, after the to-be-corrected image is obtained, the to-be-corrected image can be preprocessed to improve image quality of the to-be-corrected image, thus obtaining a more precise correction effect. The preprocessing includes image processing means such as noise reduction or gray value adjustment.

Step 103: Select, from the interference fringe images with different photographing distances, an interference fringe image corresponding to the depth value of each to-be-corrected pixel to serve as a target interference fringe image corresponding to each to-be-corrected pixel.

As shown in FIG. 2, due to the distribution interval between the photographing distances, the photographing distance may or may not be equal to the depth value. It can be understood that if the distribution interval between different photographing distances is small enough, each depth value may correspond to an equal photographing distance.

In an embodiment, when there is a photographing distance in different photographing distances equal to the depth value, the interference fringe image corresponding to the photographing distance equal to the depth value is selected as the target interference fringe image.

In another embodiment, when there is no photographing distance in different photographing distances equal to the depth value, the following embodiment is performed.

Figure 4:
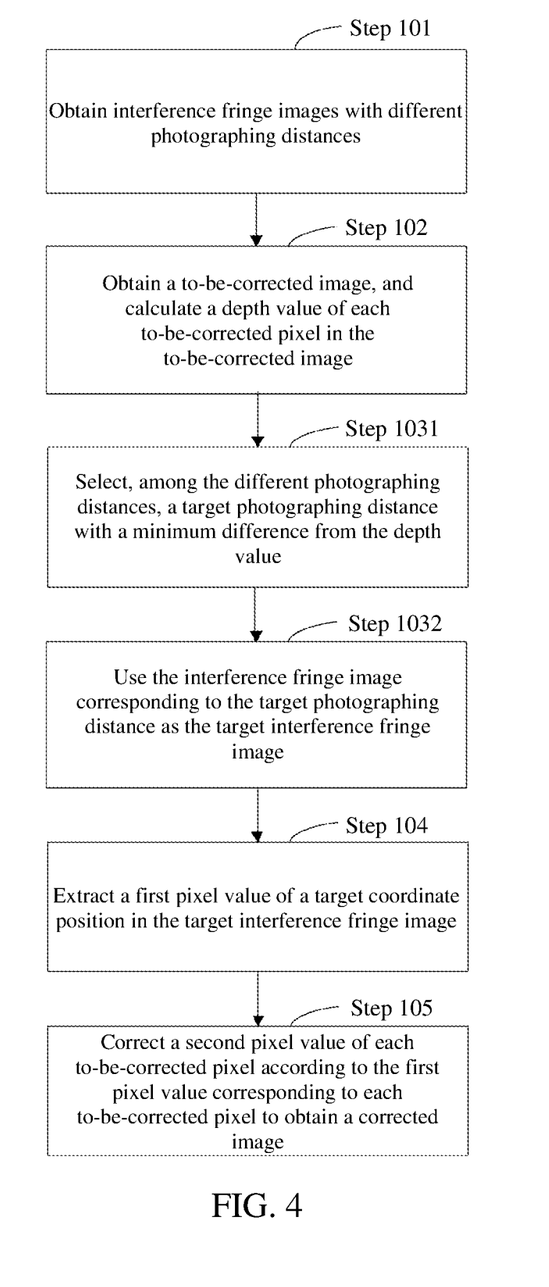
FIG. 4 is a flowchart of step 103 in the method as depicted in FIG. 1.

In an embodiment of this application, step 103 includes the following step 1031 to step 1032. FIG. 4 is a flowchart of step 103 in a correction method for interference fringes according to this application. The following steps are performed for each to-be-corrected pixel.

Step 1031: Select, among the different photographing distances, a target photographing distance with a minimum difference from the depth value.

In an embodiment of this application, there may be two target photographing distances with the minimum difference from the depth value, that is, the depth value is at the center of adjacent photographing distances. It can be seen from the foregoing content and FIG. 2 that a longer photographing distance corresponds to a smaller fringe translation variation. Therefore, when there are two target photographing distances with the minimum difference from the depth value, a larger one of the two photographing distances is selected as the target photographing distance.

Step 1032: Use the interference fringe image corresponding to the target photographing distance as the target interference fringe image.

It can be understood that the foregoing condition that there is a photographing distance equal to the depth value in different photographing distances applies to step 1031 and step 1032. That is, the difference between the photographing distance and the depth value under this condition is 0.

Step 104: Extract a first pixel value of a target coordinate position in the target interference fringe image, where the target coordinate position refers to a coordinate position of the to-be-corrected pixel corresponding to the target interference fringe image in the to-be-corrected image.

For each to-be-corrected pixel, the first pixel value of the target coordinate position is extracted in the corresponding target interference fringe image. For example, if the target coordinate position of the to-be-corrected pixel is (156, 256), the first pixel value at the coordinate position (156, 256) in the target interference fringe image is extracted.

Figure 5:
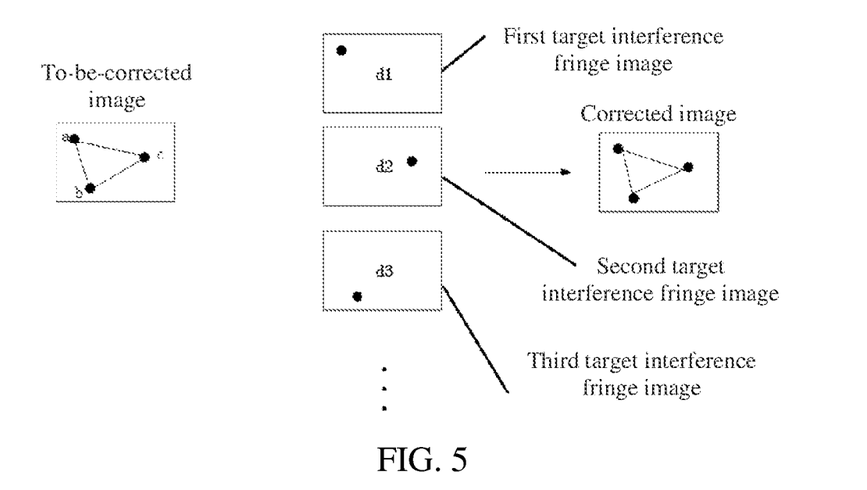
FIG. 5 is a schematic diagram of a target coordinate position according to this application.

For better illustration of step 104, referring to FIG. 5, a to-be-corrected pixel a, a to-be-corrected pixel b, and a to-be-corrected pixel c in the to-be-corrected image are used as examples. The target interference fringe image corresponding to the to-be-corrected pixel a is the first target interference fringe image containing pixel d1. The target interference fringe image corresponding to the to-be-corrected pixel b is the second target interference fringe image containing pixel d2. The target interference fringe image corresponding to the to-be-corrected pixel c is the third target interference fringe image containing pixel d3. For the to-be-corrected pixel a, the pixel d1 (the coordinate position of the to-be-corrected pixel a is the same as that of the pixel d1) in the first target interference fringe image needs to be extracted. For the to-be-corrected pixel b, the pixel d2 (the coordinate position of the to-be-corrected pixel b is the same as that of the pixel d2) in the second target interference fringe image needs to be extracted. For the to-be-corrected pixel c, the pixel d3 (the coordinate position of the to-be-corrected pixel c is the same as that of the pixel d3) in the third target interference fringe image needs to be extracted.

It should be understood that after each pixel in the to-be-corrected image is traversed, the corresponding pixels in the target interference fringe images can be integrated into a new target interference fringe image, and the new interference fringe image can be used for the next operation. In an embodiment, the pixel in the target interference fringe is directly used for the next operation, which is not limited herein.

It should be noted that FIG. 5 is only an example, and does not limit a quantity of the target interference fringe images or a quantity and positions of the to-be-corrected pixels in the to-be-corrected image in FIG. 5.

Step 105: Correct a second pixel value of each to-be-corrected pixel according to the first pixel value corresponding to each to-be-corrected pixel to obtain a corrected image.

The interference fringe images can represent first pixel values of the interference fringes at different coordinate positions. The pixel value of the pixel located in a dark fringe region needs to be increased, and the pixel value of the pixel located in a bright fringe region needs to be reduced. Therefore, the second pixel value of each to-be-corrected pixel can be corrected according to the first pixel values of different coordinate positions to obtain the corrected image. There are two correction methods as follows.

In the first correction method, a proportional relationship of all the first pixel values is calculated, and the second pixel value of each to-be-corrected pixel is adjusted according to the proportional relationship to obtain the corrected image. For example, assuming that the three first pixel values are 100, 150, and 200, the proportional relationship of the three first pixel values is 2:3:4. The second pixel values of the to-be-corrected pixels corresponding to the three first pixel values are multiplied by ½, ⅓, and ¼ respectively to obtain the corrected image (it is assumed that there are only three first pixel points in the image). However, the pixel value of the pixel located in the dark fringe region needs to be increased, and the pixel value of the pixel located in the bright fringe region needs to be reduced. The first method has a poor correction effect. Only high pixel values of the bright fringe region can be suppressed. Therefore, this application provides a more optimal second correction method.

The second correction method is shown in the following embodiment.

Figure 6:
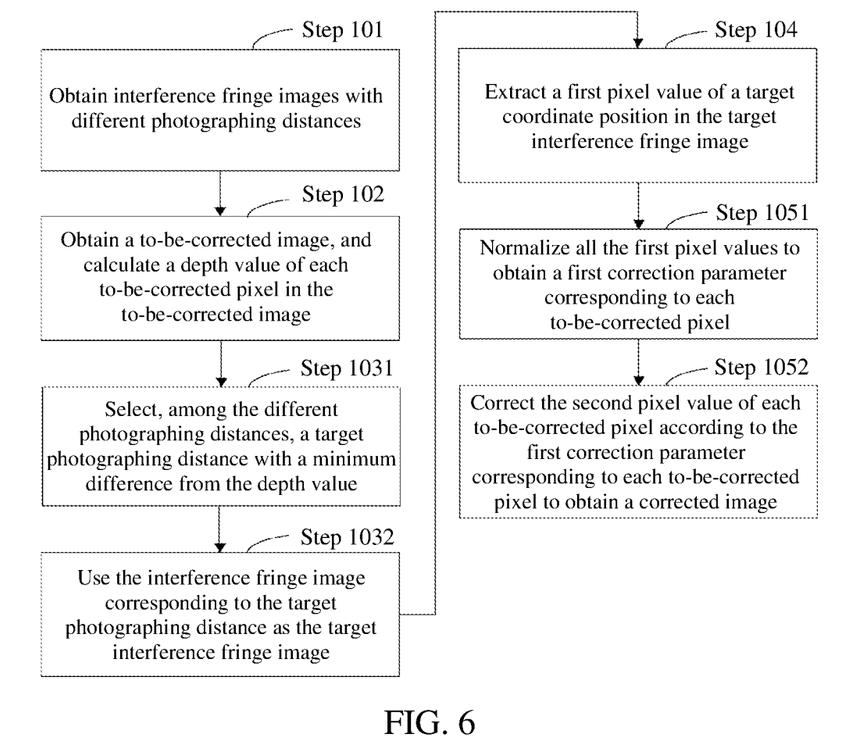
FIG. 6 is a flowchart of step 105 in the methods depicted above.

In an embodiment of this application, step 105 includes the following step 1051 to step 1052. FIG. 6 is a flowchart of step 105 in a correction method for interference fringes according to this application.

Step 1051: Normalize all the first pixel values to obtain a first correction parameter corresponding to each to-be-corrected pixel.

The interference fringes are alternately dark and bright fringes, where the pixel values are higher in the bright fringe region and lower in the dark fringe region. Therefore, in this application, the to-be-corrected pixel values in the interference fringe image are normalized to obtain the first correction parameter corresponding to each to-be-corrected pixel. The process is as follows.

Figure 7:
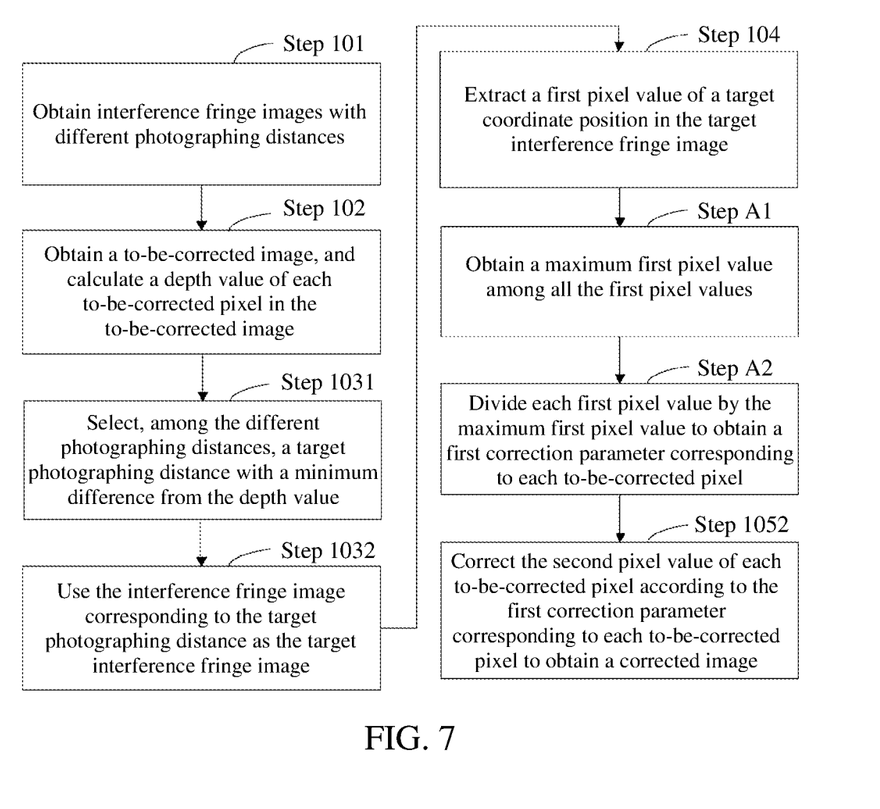
FIG. 7 is a flowchart of step 1051 in the method as depicted in FIG. 6.

In an embodiment of this application, step 1051 includes the following step A1 to step A2. FIG. 7 is a specific schematic flowchart of step 1051 in a correction method for interference fringes according to this application.

Step A1: Obtain a maximum first pixel value among all the first pixel values.

Step A2: Divide each first pixel value by the maximum first pixel value to obtain the first correction parameter corresponding to each to-be-corrected pixel.

For each first pixel, the first correction parameter corresponding to each to-be-corrected pixel is obtained by using the following formula:

$$I_a = \frac{I_b}{M}$$

where M represents the maximum first pixel value, $I_a$ represents the first correction parameter, and $I_b$ represents the first pixel value. The first correction parameter obtained using the foregoing formula is in a range of [0, 1].

Step 1052: Correct the second pixel value of each to-be-corrected pixel according to the first correction parameter corresponding to each to-be-corrected pixel to obtain the corrected image.

Figure 8:
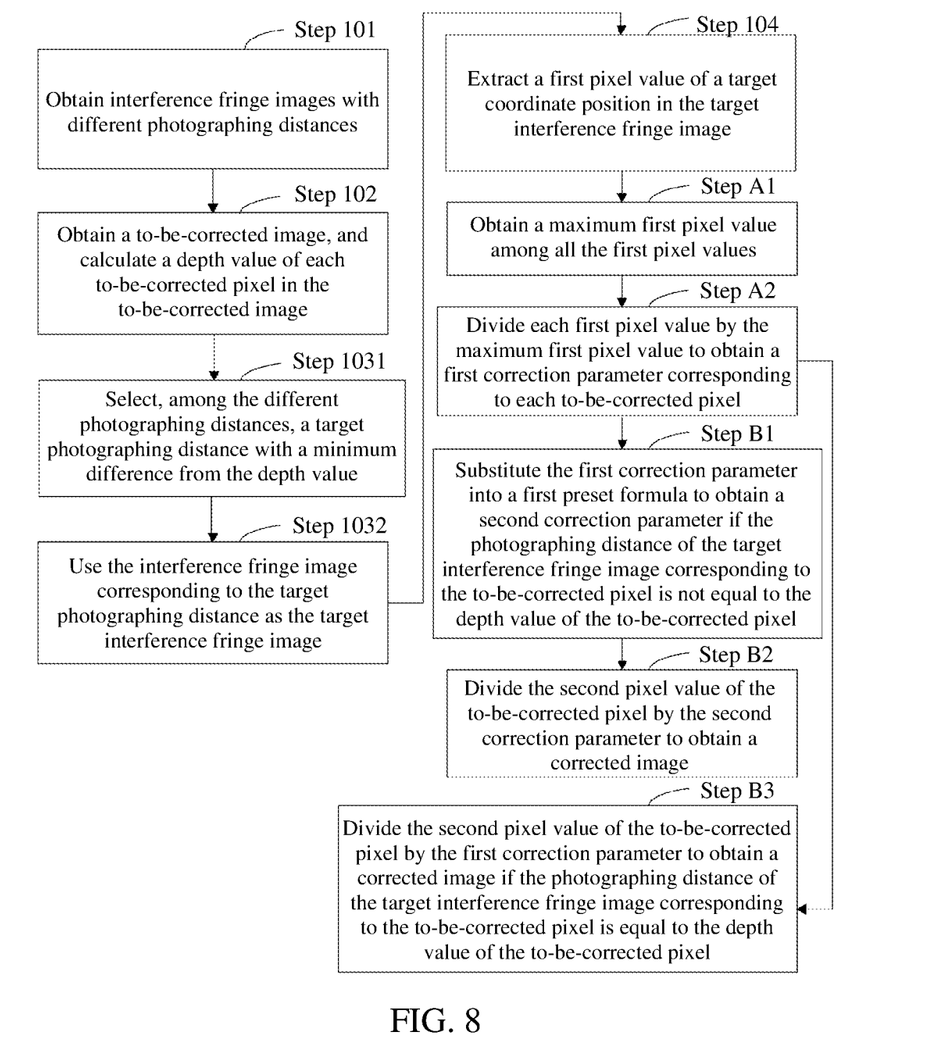
FIG. 8 is a flowchart of step 1052 in a methods as depicted in FIGS. 6 and 7.

According to step 103, the depth value may or may not be equal to the photographing distance. If the depth value is not equal to the photographing distance, step B1 to step B2 in the following embodiment are performed. If the depth value is equal to the photographing distance, step B3 in the following embodiment is performed. The specific steps are shown in the following embodiments.

In an embodiment of this application, step 1052 includes the following step B1 to step B2. FIG. 8 is a flowchart of step 1052 in a correction method for interference fringes according to this application.

The following steps are performed for each to-be-corrected pixel to obtain the corrected image.

Step B1: Substitute the first correction parameter into a first preset formula to obtain a second correction parameter if the photographing distance of the target interference fringe image corresponding to the to-be-corrected pixel is not equal to the depth value of the to-be-corrected pixel.

Because there is a difference between the depth value and the photographing distance, it is necessary to correct the first correction parameter through the first preset formula.

The first preset formula is as follows:

$$I_b = I_a \left(\frac{L_a}{L_b}\right)^2$$

where $I_a$ represents the first correction parameter, $I_b$ represents the second correction parameter, $L_a$ represents the photographing distance of the target interference fringe image corresponding to the to-be-corrected pixel, and $L_b$ represents the depth value of the to-be-corrected pixel.

Step B2: Divide the second pixel value of the to-be-corrected pixel by the second correction parameter to obtain the corrected image.

In step B2, the second pixel value of each to-be-corrected pixel can be divided by the second correction parameter corresponding to each to-be-corrected pixel, to obtain the corrected image. In an embodiment, the second pixel value of each to-be-corrected pixel can be divided by the second correction parameter corresponding to each to-be-corrected pixel, and multiplied by a preset adjustment coefficient (the adjustment coefficient is used to adjust the correction intensity, and can be preset according to an actual application scenario) to obtain the corrected image.

It can be understood that when the correction parameter approaches 1, the correction amplitude is low. When the correction parameter approaches 0, the correction amplitude is high. Therefore, the second correction method can not only suppress the pixel values in the bright fringe region, but also increase the pixel values in the dark fringe region, to achieve an excellent correction effect.

Step B3: Divide the second pixel value of the to-be-corrected pixel by the first correction parameter to obtain the corrected image if the photographing distance of the target interference fringe image corresponding to the to-be-corrected pixel is equal to the depth value of the to-be-corrected pixel.

In this embodiment, a target interference fringe image corresponding to each to-be-corrected pixel is obtained through matching based on each to-be-corrected pixel in a to-be-corrected image. A first pixel value is obtained in the target interference fringe image according to a target coordinate position of each to-be-corrected pixel. The to-be-corrected pixel is corrected according to the first pixel value (because the first pixel values of the interference fringes at different coordinate positions can be well represented in the target interference fringe image, the to-be-corrected pixel can be corrected based on the first pixel value in the target interference fringe image). By correcting to-be-corrected pixels one after another, the foregoing solution alleviates the problem of the poor quality of a captured image caused by the interference fringes.

Figure 9:
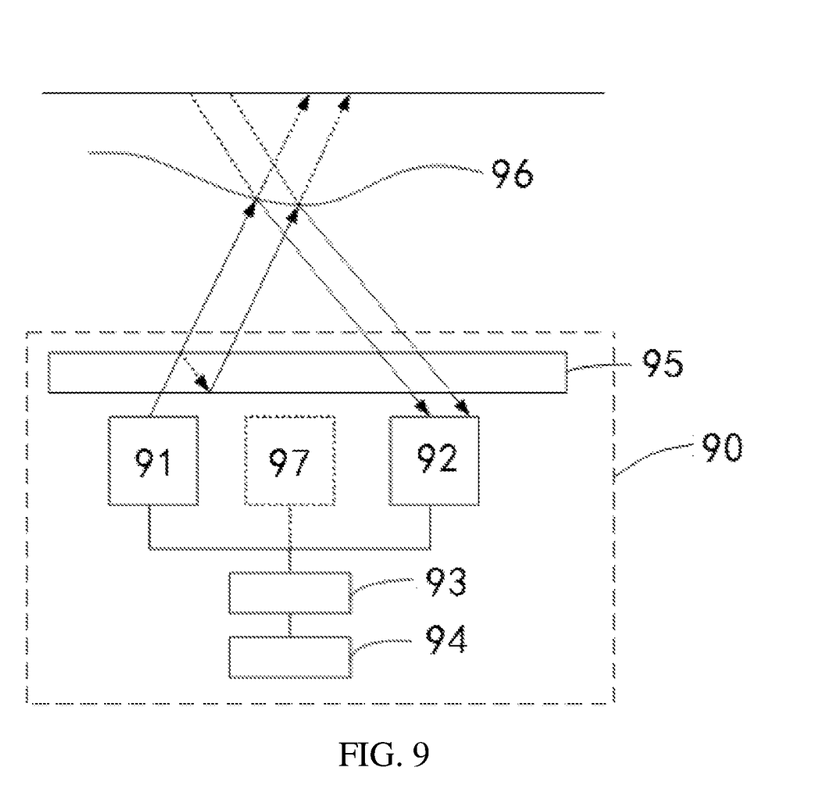
FIG. 9 is a schematic diagram of an under-screen system according to an embodiment of this application.

FIG. 9 is a schematic diagram of an under-screen system according to an embodiment of this application. As shown in FIG. 9, the under-screen system 90 in this embodiment includes an illumination source 91, a capture module 92, a processor 93, a memory 94, and a display screen 95.

The illumination source 91 is configured to emit an infrared beam to a target plane 96 through the display screen 95.

The capture module 92 is configured to receive an optical signal that passes through the display screen 95 after being reflected by the target plane, obtain an infrared image of the target region 96, and transmit the infrared image to the processor 93.

The processor 93 is configured to correct the infrared image by using preset interference fringe images and the correction method for interference fringes described in the solution of any one of the foregoing embodiments.

The memory 94 is configured to store the interference fringe images with different photographing distances and a computer program executable on the processor.

It should be noted that when either of the illumination source 91 and the capture module 92 is under the display screen 95, if the infrared image captured by the capture module 95 includes interference fringes, the infrared image can still be corrected by using the foregoing correction method for interference fringes, which is not limited herein.

In an embodiment, if the illumination source 91 emits a structured light beam to the target region 96 through the display screen 95, the under-screen system 90 further includes a floodlight module 107 which projects a floodlight beam to the target region 96 through the display screen 95. The capture module 92, on the one hand, receives a structured light signal reflected by the target region and transmits the structured light signal to the processor 93 to obtain the depth value of the target region, and on the other hand, receives a floodlight signal reflected by the target region to form the infrared image. The infrared image is further corrected according to the foregoing method.

It should be understood that if the illumination source 91 emits the infrared beam to the target region 96 through the display screen 95, the under-screen system 90 does not need supplementary lighting. The capture module can directly capture the infrared image, and the infrared image is further corrected according to the foregoing method.

In an embodiment, the processor 93 performs the steps in the embodiment of the correction method for interference fringes. For example, the steps may be performed by one or more units in the processor 93 to complete this application.

Figure 10:
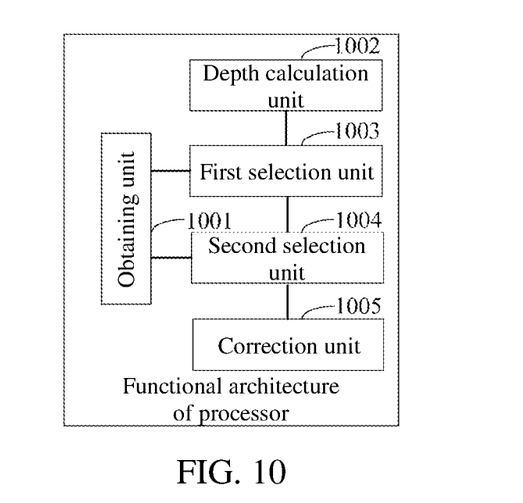
FIG. 10 is a schematic diagram of an architecture of a processor according to this application.

The divisible units (FIG. 10 is a schematic diagram of an architecture of a processor according to this application) perform functions as follows.

An obtaining unit 1001 is configured to obtain an infrared image in a target region captured by a capture module.

A depth calculation unit 1002 is configured to calculate a depth value of each to-be-corrected pixel in the infrared image.

A first selection unit 1003 is configured to select, from interference fringe images with different photographing distances stored in a memory, an interference fringe image corresponding to the depth value of each to-be-corrected pixel to serve as a target interference fringe image corresponding to each to-be-corrected pixel.

A second selection unit 1004 is configured to extract a first pixel value of a target coordinate position in the target interference fringe image, where the target coordinate position refers to a coordinate position of the to-be-corrected pixel corresponding to the target interference fringe image in the infrared image.

A correction unit 1005 is configured to correct a second pixel value of each to-be-corrected pixel according to the first pixel value corresponding to each to-be-corrected pixel to obtain a corrected image.

This application provides an under-screen system in which a target interference fringe image corresponding to each to-be-corrected pixel is obtained through matching based on each to-be-corrected pixel in an infrared image. A first pixel value is obtained in the target interference fringe image according to a target coordinate position of each to-be-corrected pixel. The to-be-corrected pixel is corrected according to the first pixel value (because the first pixel values of the interference fringes at different coordinate positions can be well represented in the target interference fringe image, the to-be-corrected pixel can be corrected based on the first pixel value in the target interference fringe image). By correcting to-be-corrected pixels one after another, the foregoing solution alleviates the problem of poor quality of a captured image caused by the interference fringes.

A person skilled in the art can understand that the under-screen system includes, but is not limited to, the foregoing modules and the foregoing combinations. FIG. 9 is merely an example of an under-screen system, and does not constitute a limitation to the under-screen system. The under-screen system may include more or fewer components than those shown in the figure, or a portion of components may be combined, or different components may be used. For example, the under-screen system may further include an input/output device, a network access device, a bus, and the like.

The camera module includes a capture module and an illumination source. The illumination source includes a light source and an optical assembly (the optical assembly may include a diffractive optical element). The light source may be an edge emitting laser (EEL), a vertical cavity surface emitting laser (VCSEL), or the like, or may be a light source array formed by a plurality of light sources. A beam emitted by the light source may be visible light, infrared light, ultraviolet light, or the like. The beam emitted by the light source can form a uniform, random or specially designed projection pattern of intensity distribution on a reference plane. The camera includes modules such as an image sensor and a lens unit. The lens unit receives a portion of the beam reflected by an object and forms an image on the image sensor. The image sensor may be an image sensor formed by a charge coupled device (CCD), a complementary metaloxide-semiconductor transistor (CMOS), an avalanche diode (AD), a single photon avalanche diode (SPAD), and the like.

The processor may be a central processing unit (CPU), or may be another general-purpose processor, a digital signal processor (DSP), an application specific integrated circuit (ASIC), a field-programmable gate array (FPGA), or another programmable logic device, a discrete gate or a transistor logic device, a discrete hardware component, or the like. The general-purpose processor may be a microprocessor, or the processor may be any conventional processor or the like.

The memory may be an internal storage unit of the under-screen system, such as a hard disk or a memory of the under-screen system. The memory may be an external storage device of the under-screen system, for example, a removable hard disk, a smart media card (SMC), a secure digital (SD) card, or a flash card equipped on the under-screen system. Further, the memory may further include an internal storage unit of the under-screen system and an external storage device. The memory is configured to store the computer program and another program and data that are required by the roaming control device. The memory may be further configured to temporarily store data that is outputted or to be outputted.

It is to be understood that the order of the sequence numbers of the steps in the foregoing embodiments does not mean the order of execution, and the execution order of each process is determined by its function and inherent logic, and does not constitute any limitation on the implementation process of the embodiments of this application.

It should be noted that, since the contents, such as information interactions among the apparatus/units and the execution procedures are based on the same concept as the method embodiments of this application, for the specific functions and technical effects thereof, reference may be made to the method embodiments, which are not described herein again.

A person skilled in the art may clearly understand that, for the purpose of convenient and brief description, only division of the foregoing function units is used as an example for description. In the practical application, the functions may be allocated to and completed by different functional modules according to requirements. That is, an internal structure of the device is divided into different functional units or modules, to complete all or some of the functions described above. Functional units and modules in the embodiments may be integrated into one processing unit, or each of the units may exist alone physically, or two or more units are integrated into one unit. The integrated unit may be implemented in the form of hardware, or may be implemented in the form of a software function unit. In addition, the specific names of each functional unit and module are only for the purpose of distinguishing each other, and are not used to limit the protection scope of this application. For specific work processes of the units and modules in the system, reference may be made to corresponding processes in the foregoing method embodiments, and details are not described herein again.

An embodiment of this application further provides a computer-readable storage medium (e.g., a non-transitory computer-readable storage medium), storing a computer program, where the computer program, when executed by a processor, implements the steps of the method embodiments.

An embodiment of this application provides a computer program product, where the computer program product, when run on a mobile terminal, causes the mobile terminal to perform the steps of the method embodiments.

When the integrated unit is implemented in the form of a software functional unit and sold or used as an independent product, the integrated unit may be stored in a computer-readable storage medium. Based on such understanding, all or some of the processes of the methods in the embodiments may be implemented by a computer program instructing relevant hardware. The computer program may be stored in a computer-readable storage medium. During execution of the computer program by the processor, steps of the foregoing method embodiments may be implemented. The computer program includes computer program code. The computer program code may be in source code form, object code form, executable file, or some intermediate forms, or the like. The computer-readable medium may include at least: any entity or apparatus that is capable of carrying the computer program code to a camera device/living body detection equipment, a recording medium, a computer memory, a read-only memory (ROM), a random access memory (RAM), an electric carrier signal, a telecommunication signal and a software distribution medium, for example, a USB flash drive, a mobile hard disk, a magnetic disk, or an optical disc. In some jurisdictions, according to legislation and patent practice, the computer-readable medium cannot be an electric carrier signal or a telecommunication signal.

In the embodiments, descriptions of the embodiments have different emphases. As for parts that are not described in detail in one embodiment, reference can be made to the relevant descriptions of the other embodiments.

A person of ordinary skill in the art may notice that the exemplary units and algorithm steps described with reference to the embodiments disclosed in this specification can be implemented in electronic hardware, or a combination of computer software and electronic hardware. Whether the functions are executed in a mode of hardware or software depends on particular applications and design constraint conditions of the technical solutions. A person skilled in the art may use different methods to implement the described functions for each particular application, but it is not to be considered that the implementation goes beyond the scope of this application.

In the embodiments provided in this application, it is to be understood that the disclosed apparatus/network device and method may be implemented in other manners. For example, the described apparatus/network device embodiment is merely an example. For example, the module or unit division is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate components may or may not be physically separated, and the components displayed as units may or may not be physical units, and may be located in one place or may be distributed over a plurality of network units.

It is to be understood that when used in this specification and the appended claims of this application, the terms "include" indicate the presence of described features, wholes, steps, operations, elements and/or components, but do not exclude the presence or addition of one or more other features, wholes, steps, operations, elements, components and/or a set thereof.

It is to be further understood that a term "and/or" used in this specification of this application and the appended claims refers to one or more of any and all possible combinations of the associated items that is listed and includes the combinations.

As used in this specification and the appended claims of this application, the term "if" may be interpreted as "when" or "once" or "in response to determining" or "in response to detecting" according to the context. Similarly, the phrase "if determining" or "if detecting [described condition or event]" may be interpreted as "once determining" or "in response to determining" or "once detecting [described condition or event]" or "in response to detecting [described condition or event]" according to the context.

In addition, in the description of this specification and the appended claims of this application, the terms "first", "second", and "third" are merely for distinguishing descriptions, and shall not be understood as an indication or implication of relative importance.

"An embodiment" or "some embodiments" described in the specification of this application means that particular features, structures, or characteristics described with reference to the embodiment are included in one or more embodiments of this application. Therefore, the phrases such as "in an embodiment", "in some embodiments", "in some other embodiments", and "in still other embodiments" in various paragraphs in this specification are not necessarily all refer to the same embodiment, but mean "one or more but not all embodiments" unless specifically emphasized otherwise. The terms "including", "comprising", "having", and variants thereof mean "including but not limited to" unless specifically emphasized otherwise.

The foregoing embodiments are merely for describing the technical solutions of this application, but not for limiting this application. Although this application is described in detail with reference to the foregoing embodiments, it should be appreciated by a person skilled in the art that, modifications may still be made to the technical solutions described in the foregoing embodiments, or equivalent replacements may be made to the part of the technical features; and these modifications or replacements will not cause the essence of corresponding technical solutions to depart from the spirit and the scope of the technical solutions in the embodiments of this application, and shall fall within the protection scope of this application.

What is claimed is:

1. A method for correcting interference fringes, comprising:
    obtaining interference fringe images with different photographing distances, wherein each of the interference fringe images is captured by a camera and comprises interference fringes formed by an illumination source illuminating a target plane through a display screen; and each of the interference fringe images represents first pixel values of the interference fringes at different coordinate positions;
    obtaining a to-be-corrected image comprising to-be-corrected pixels, and calculating a depth value of each of the to-be-corrected pixels in the to-be-corrected image;
    selecting, from the interference fringe images with different photographing distances, an interference fringe image corresponding to the depth value of each of the to-be-corrected pixels as a target interference fringe image;
    extracting first pixel values of target coordinate positions in the target interference fringe image, wherein the target coordinate positions are indictive of coordinate positions of the to-be-corrected pixels corresponding to the target interference fringe image in the to-be-corrected image; and
    correcting second pixel values of the to-be-corrected pixels according to the first pixel values corresponding to the to-be-corrected pixels to obtain a corrected image.

2. The method according to claim 1, wherein the correcting the second pixel values of the to-be-corrected pixels according to the first pixel values corresponding to the to-be-corrected pixels to obtain the corrected image comprises:
    normalizing the first pixel values to obtain a first correction parameter corresponding to each of the to-be-corrected pixels; and
    correcting the second pixel values of the to-be-corrected pixels according to the first correction parameter to obtain the corrected image.

3. The method according to claim 2, wherein the normalizing the first pixel values to obtain the first correction parameter corresponding to each of the to-be-corrected pixels comprises:
    obtaining a maximum first pixel value from the first pixel values; and
    dividing each of the first pixel values by the maximum first pixel value to obtain the first correction parameter corresponding to each of the to-be-corrected pixels.

4. The method according to claim 2, wherein the correcting the second pixel values of the to-be-corrected pixels according to the first correction parameter to obtain the corrected image comprises:
    for each of the to-be-corrected pixels:
    obtaining a second correction parameter according to a first preset formula, in response to that the photographing distance of the target interference fringe image corresponding to the to-be-corrected pixel is not equal to the depth value of the to-be-corrected pixel,
    wherein the first preset formula is as follows:

$$I_b = I_a \left(\frac{L_a}{L_b}\right)^2$$

wherein $I_a$ represents the first correction parameter, $I_b$ represents the second correction parameter, $L_a$ represents the photographing distance of the target interference fringe image corresponding to the to-be-corrected pixel, and $L_b$ represents the depth value of the to-be-corrected pixel; and
    dividing the second pixel value of the to-be-corrected pixel by the second correction parameter to obtain the corrected image.

5. The method according to claim 2, wherein the correcting the second pixel values of the to-be-corrected pixels according to the first correction parameter to obtain the corrected image comprises:
    for each of the to-be-corrected pixels:
    dividing the second pixel value of the to-be-corrected pixel by the first correction parameter to obtain the corrected image, in response to that the photographing distance of the target interference fringe image corresponding to the to-be-corrected pixel is equal to the depth value of the to-be-corrected pixel.

6. The method according to claim 1, wherein the selecting, from the interference fringe images with different photographing distances, an interference fringe image corresponding to the depth value of each of the to-be-corrected pixels as a target interference fringe image comprises:
for each of the to-be-corrected pixels:
selecting, among the different photographing distances, a target photographing distance with a minimum difference from the depth value; and
using an interference fringe image corresponding to the target photographing distance as the target interference fringe image.

7. The method according to claim 6, wherein the selecting, among the different photographing distances, the target photographing distance with the minimum difference from the depth value comprises:
using a larger photographing distance in adjacent two photographing distances as the target photographing distance, in response to that the depth value is at a center of the two adjacent photographing distances.

8. An under-screen system, comprising a display screen, an illumination source, a camera, a processor, and a memory, wherein
the illumination source is configured to emit an infrared beam to a target region through the display screen; and the target region comprises a target plane;
the camera is configured to receive an optical signal that passes through the display screen after being reflected by the target region, obtain an infrared image of the target region, and transmit the infrared image to the processor;
the memory is configured to store interference fringe images with different photographing distances and a computer program executable on the processor; and
the processor is configured to correct the infrared image by using the interference fringe images with different photographing distances and executing the computer program to perform operations comprising:
obtaining interference fringe images with different photographing distances, wherein each of the interference fringe images is captured by a camera and comprises interference fringes formed by an illumination source illuminating a target plane through a display screen; and each of the interference fringe images represents first pixel values of the interference fringes at different coordinate positions;
obtaining a to-be-corrected image comprising to-be-corrected pixels, and calculating a depth value of each of the to-be-corrected pixels in the to-be-corrected image;
selecting, from the interference fringe images with different photographing distances, an interference fringe image corresponding to the depth value of each of the to-be-corrected pixels as a target interference fringe image;
extracting first pixel values of target coordinate positions in the target interference fringe image, wherein the target coordinate positions are indictive of coordinate positions of the to-be-corrected pixels corresponding to the target interference fringe image in the to-be-corrected image; and
correcting second pixel values of the to-be-corrected pixels according to the first pixel values corresponding to the to-be-corrected pixels to obtain a corrected image.

9. The system according to claim 8, wherein a beam emitted by the illumination source to the target region through the display screen is a structured light beam, the system further comprises a floodlight module configured to project a floodlight beam to the target region, and the camera is configured to capture a floodlight optical signal reflected by the target region and obtain the infrared image of the target plane.

10. The system according to claim 8, wherein the correcting the second pixel values of the to-be-corrected pixels according to the first pixel values corresponding to the to-be-corrected pixels to obtain the corrected image comprises:
normalizing the first pixel values to obtain a first correction parameter corresponding to each of the to-be-corrected pixels; and
correcting the second pixel values of the to-be-corrected pixels according to the first correction parameter to obtain the corrected image.

11. The system according to claim 10, wherein the normalizing the first pixel values to obtain the first correction parameter corresponding to each of the to-be-corrected pixels comprises:
obtaining a maximum first pixel value from the first pixel values; and
dividing each of the first pixel values by the maximum first pixel value to obtain the first correction parameter corresponding to each of the to-be-corrected pixels.

12. The system according to claim 10, wherein the correcting the second pixel values of the to-be-corrected pixels according to the first correction parameter to obtain the corrected image comprises:
for each of the to-be-corrected pixels:
obtaining a second correction parameter according to a first preset formula, in response to that the photographing distance of the target interference fringe image corresponding to the to-be-corrected pixel is not equal to the depth value of the to-be-corrected pixel,
wherein the first preset formula is as follows:

$$I_b = I_a \left(\frac{L_a}{L_b}\right)^2$$

wherein $I_a$ represents the first correction parameter, $I_b$ represents the second correction parameter, $L_a$ represents the photographing distance of the target interference fringe image corresponding to the to-be-corrected pixel, and $L_b$ represents the depth value of the to-be-corrected pixel; and
dividing the second pixel value of the to-be-corrected pixel by the second correction parameter to obtain the corrected image.

13. The system according to claim 10, wherein the correcting the second pixel values of the to-be-corrected pixels according to the first correction parameter to obtain the corrected image comprises:
for each of the to-be-corrected pixels:
dividing the second pixel value of the to-be-corrected pixel by the first correction parameter to obtain the corrected image, in response to that the photographing distance of the target interference fringe image corresponding to the to-be-corrected pixel is equal to the depth value of the to-be-corrected pixel.

14. The system according to claim 8, wherein the selecting, from the interference fringe images with different photographing distances, an interference fringe image corresponding to the depth value of each of the to-be-corrected pixels as a target interference fringe image comprises:

for each of the to-be-corrected pixels:
selecting, among the different photographing distances, a target photographing distance with a minimum difference from the depth value; and
using an interference fringe image corresponding to the target photographing distance as the target interference fringe image.

15. The system according to claim 14, wherein the selecting, among the different photographing distances, the target photographing distance with the minimum difference from the depth value comprises:
using a maximum photographing distance in adjacent photographing distances as the target photographing distance, in response to that the depth value is at a center of the adjacent photographing distances.

16. A non-transitory computer-readable storage medium, storing a computer program, wherein the computer program, when executed by a processor, performs operations comprising:
obtaining interference fringe images with different photographing distances, wherein each of the interference fringe images is captured by a camera and comprises interference fringes formed by an illumination source illuminating a target plane through a display screen; and each of the interference fringe images represents first pixel values of the interference fringes at different coordinate positions;
obtaining a to-be-corrected image comprising to-be-corrected pixels, and calculating a depth value of each of the to-be-corrected pixels in the to-be-corrected image;
selecting, from the interference fringe images with different photographing distances, an interference fringe image corresponding to the depth value of each of the to-be-corrected pixels as a target interference fringe image;
extracting first pixel values of target coordinate positions in the target interference fringe image, wherein the target coordinate positions are indictive of coordinate positions of the to-be-corrected pixels corresponding to the target interference fringe image in the to-be-corrected image; and
correcting second pixel values of the to-be-corrected pixels according to the first pixel values corresponding to the to-be-corrected pixels to obtain a corrected image.

17. The medium according to claim 16, wherein the correcting the second pixel values of the to-be-corrected pixels according to the first pixel values corresponding to the to-be-corrected pixels to obtain the corrected image comprises:

normalizing the first pixel values to obtain a first correction parameter corresponding to each of the to-be-corrected pixels; and
correcting the second pixel values of the to-be-corrected pixels according to the first correction parameter to obtain the corrected image.

18. The medium according to claim 17, wherein the normalizing the first pixel values to obtain the first correction parameter corresponding to each of the to-be-corrected pixels comprises:
obtaining a maximum first pixel value from the first pixel values; and
dividing each of the first pixel values by the maximum first pixel value to obtain the first correction parameter corresponding to each of the to-be-corrected pixels.

19. The medium according to claim 17, wherein the correcting the second pixel values of the to-be-corrected pixels according to the first correction parameter to obtain the corrected image comprises:
for each of the to-be-corrected pixels:
obtaining a second correction parameter according to a first preset formula, in response to that the photographing distance of the target interference fringe image corresponding to the to-be-corrected pixel is not equal to the depth value of the to-be-corrected pixel,
wherein the first preset formula is as follows:

$$I_b = I_a \left(\frac{L_a}{L_b}\right)^2$$

wherein $I_a$ represents the first correction parameter, $I_b$ represents the second correction parameter, $L_a$ represents the photographing distance of the target interference fringe image corresponding to the to-be-corrected pixel, and $L_b$ represents the depth value of the to-be-corrected pixel; and
dividing the second pixel value of the to-be-corrected pixel by the second correction parameter to obtain the corrected image.

20. The medium according to claim 17, wherein the correcting the second pixel values of the to-be-corrected pixels according to the first correction parameter to obtain the corrected image comprises:
for each of the to-be-corrected pixels:
dividing the second pixel value of the to-be-corrected pixel by the first correction parameter to obtain the corrected image, in response to that the photographing distance of the target interference fringe image corresponding to the to-be-corrected pixel is equal to the depth value of the to-be-corrected pixel.

* * * * *